Patented May 21, 1940

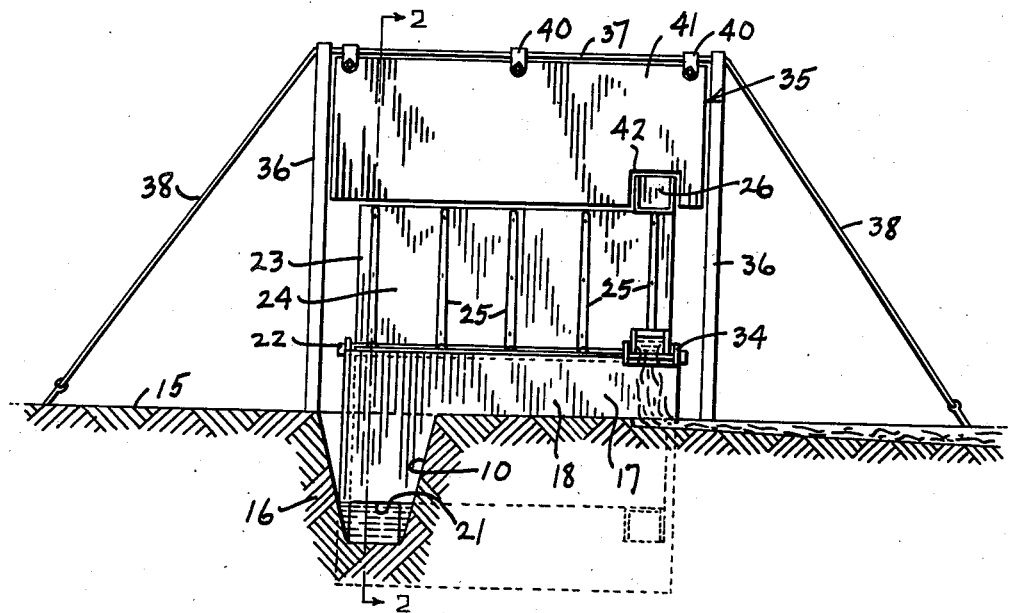
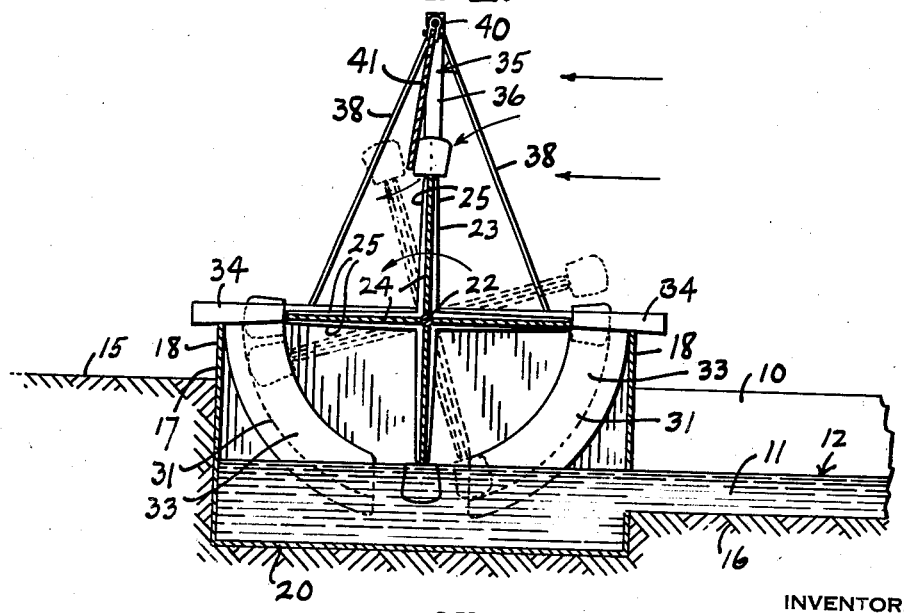

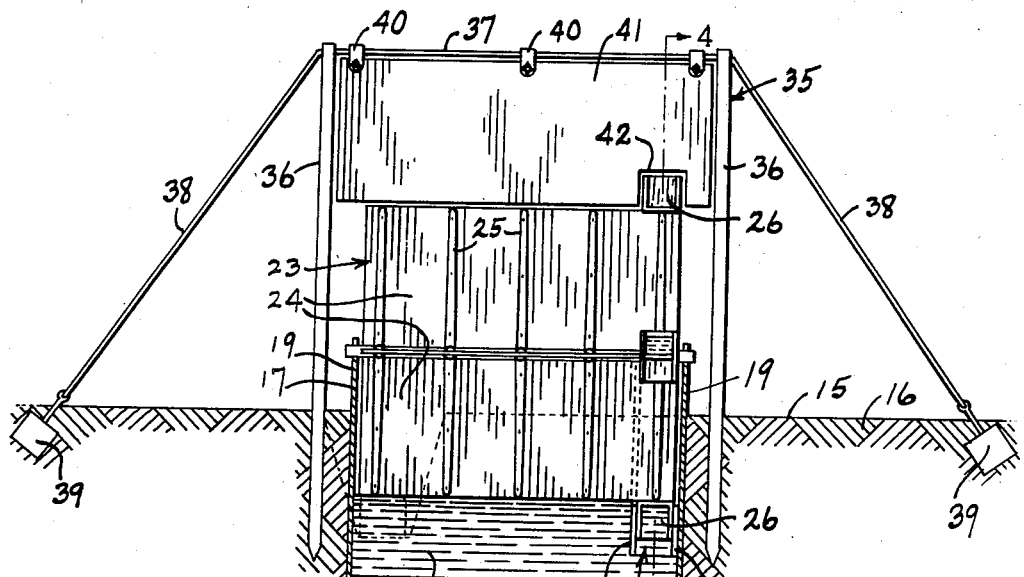
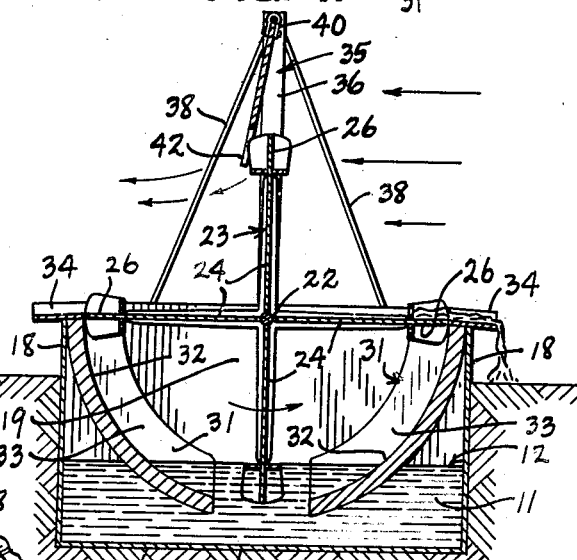
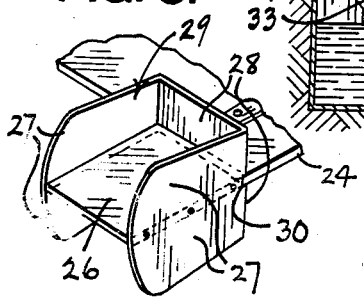
INVENTOR.
Ulysses G. Rogers

2,201,503

UNITED STATES PATENT OFFICE 2,201,503

WATER LIFT

Ulysses G. Rogers, Medicine Lodge, Kans.

Application May 8, 1939, Serial No. 272,531

5 Claims. (Cl. 103—59)

The present invention relates to improvements in wind motors and wind actuated water lifts, and the primary object of the invention is to provide a wind actuated water lift for elevating water from an irrigation ditch.

Another object of the invention is to provide a water lift including a wind wheel including means to shield a portion of the wheel from wind approaching the wheel from either side.

A further object of the invention resides in the provision of a wind wheel including means to deflect extraneous wind toward the wind wheel.

Yet another object of the invention is the provision of a combined wind motor and water lift.

A still further object of the invention is to provide a water lift including a paddle-wheel and improved trough means co-acting with the paddle wheel to elevate successive quantities of water.

Other objects and advantages of the invention will become apparent during the course of the following detailed description, taken in connection with the accompanying drawings, forming a part of this specification, and in which drawings:

Figure 1 is a view in side elevation of the wind actuated water lift and showing its relationship to an irrigation ditch.

Figure 2 is a vertical transverse sectional view substantially on the line 2—2 of Figure 1.

Figure 3 is a vertical longitudinal sectional view of the wind actuated water lift shown in Figure 1.

Figure 4 is a vertical transverse sectional view substantially on the line 4—4 of Figure 3.

Figure 5 is a fragmentary detail view in perspective of a scoop-like paddle preferably forming a part of the invention.

In the drawings, which for the purpose of illustration show only a preferred embodiment of the invention, and wherein similar reference characters denote corresponding parts throughout the several views, 10 designates a ditch containing water 11 to a given level 12.

Positioned partly below the grade 15 of the ground 16 through which the ditch 10 runs is a box-like frame 17 including side walls 18, end walls 19, and a bottom wall 20 forming a water reservoir in communication with the ditch, as by a suitable opening 21 in one of the side walls. The bottom wall 20 of the reservoir may be disposed below the bottom of the ditch 10, if desired. Mounted for rotation transversely of the end walls 19, is an axle 22, having its axis horizontal, and forming part of a wind-wheel 23. Extending radially from the axle are wing-like blades 24 which may be provided with radial reinforcing arms 25 in spaced relation at opposite sides of the blades. Preferably the blades 24 are of a length no greater than the distance from the axle 22 to the water level 12 so that the blades will not tend to dip into the water and retard any rotary movement of the wind-wheel. In the example shown, four equi-angularly spaced blades 24 are provided, but it will be understood that the number of blades may vary.

Each blade 24 may rigidly carry a shovel or paddle 26 which may, if desired, form an integral extension from the outer edge of the blade 24. These shovels or paddles 26 preferably are of a width considerably less than the width of the blades 24 and may be located at a given end of the wind-wheel. It will be seen that the shovels or paddles 26 form a paddle-wheel which is rotatable with the wind-wheel about the axle 22. Referring to Figure 5 of the drawings, each shovel or paddle 26 may be provided on opposite faces with sides 27 and backs 28, and in the example shown, a single U-shaped sheet 29 is secured at its opposite end portions to the sides of the shovel or paddle, the intermediate portion of the sheet being slotted at 30 so as to admit the shovel or paddle.

Secured to an end wall of the frame is a pair of arcuate segmental troughs 31 each including a bottom wall 32 and side walls 33. These troughs 31 form channels disposed in the path of movement of the paddles, each channel extending between opposite extremities of a trough and disposed one extremity below and the other above the water level. Preferably the upper extremities of the channels are located inwardly adjacent the side walls 18 of the box-like frame, and in a horizontal plane intersecting the wind-wheel axle 22, although the location of the upper extremities of the channel may vary. Suitable gutters 34 forming ducts leading from the upper extremities of the troughs 31 across the side walls 18 of the frame may be provided, if desired.

It will be noted that the side walls 18 of the frame form shields which prevent wind approaching the frame from either side from acting upon the wind-wheel blades below the axle 22.

Means 35 is provided to deflect extraneous wind toward the wind-wheel blades above the axle 22.

Set into the ground adjacent opposite end walls of the frame is a pair of posts 36 supporting a horizontal cable 37 braced by cables 38 attached to heavy underground weights 39. Pivotally supported in depending relation from the cable 37 as by hangers 40 is a wind deflector panel 41 having a notch 42 in its lower margin for the accommodation of the shovels or paddles 26 during rotation of the paddle-wheel.

The operation of the wind actuated water lift is automatic and may be readily understood from an inspection of Figures 2 and 4. In these views, arrows are employed to designate the direction of wind from right to left and the direction of rotation of the wind-wheel as counter-clockwise. The wind-wheel will of course be turned in a clock-wise direction when the direction of the wind is from left to right. In either case the wind deflector panel 41 is tilted or swung in the direction of the wind current and the wind is diverted downwardly so as to act upon one or more blades of the wind-wheel above the axle thereof. As the wind-wheel rotates, the scoop-like shovels or paddles successively dip into the water, pass along one of the arcuate segmental troughs and thereby lift a quantity of water in advance of the shovels or paddles to the upper extremity of the trough, where the water escapes by flowing along the adjacent gutter 34 and over the side wall of the reservoir.

Various changes may be made in the form of invention herein shown and described, without departing from the spirit of the invention or the scope of the followings claims.

I claim:

1. In a wind actuated water lift, a wind-wheel including an axle and blades extending from the axle and terminating within a given distance radially from the axle, paddles carried by the wind-wheel and extending radially therefrom a fixed distance beyond said given distance, means rotatably supporting the wind-wheel with its axle spaced above the level of a body of water a distance substantially equal to the given distance, means shielding from the wind the wind-wheel blades at one side of the axle and an arcuate trough providing a channel along the path of travel of the paddles and including opposite ends one below and the other above the level of said body of water.

2. In a wind actuated water lift, a wind-wheel including an axle and blades extending from the axle and terminating within a given distance radially from the axle, scoop-like paddles carried by the wind-wheel and extending radially therefrom a fixed distance beyond said given distance, means rotatably supporting the wind-wheel with its axle spaced above the level of a body of water a distance substantially equal to the given distance, means shielding from the wind the wind-wheel blades at one side of the axle, and an arcuate strip providing a surface bounding the path of travel of said paddles and including opposite ends one below and the other above the level of said body of water.

3. In a wind actuated water lift, a water reservoir having side walls, end walls, and an open top, said walls extending above the level of water in said reservoir, a wind-wheel including an axle rotatably supported in a horizontal plane by said end walls and blades disposed in radial planes intersecting the axle, said blades being of a length substantially equal to the distance from said axle to said water level, the side walls of said reservoir being of a height sufficient to shield the blades below the axle from wind approaching the reservoir from either side, paddles rotatably carried by the wind-wheel so as to dip into the water in said reservoir, and trough means providing channels in the path of said paddles and extending between zones below and above the level of the water.

4. In a wind actuated water lift, a wind-wheel including an axle and blades extending from the axle and terminating within a given distance radially from the axle, paddles carried by the wind-wheel and extending radially therefrom a fixed distance beyond said given distance, said paddles being of a width less than the width of said blades, means rotatably supporting the wind-wheel with its axle spaced above the level of a body of water a distance substantially equal to the given distance, means shielding from the wind the blades below the axle, an arcuate trough providing a channel along the path of travel of the paddles and including opposite ends one disposed below and the other above the level of said body of water, a deflector plate, and means pivotally supporting the deflector plate in pendant relation superjacent the path of rotation of the wind-wheel to deflect extraneous wind downwardly toward the blades above the axle, said deflector plate being provided with a notch extending upwardly from its pendant lower marginal edge in the path of travel of said paddles and of a size to permit passage of said paddles therethrough.

5. In a wind actuated water lift, a wind-wheel including an axle and blades extending from the axle and terminating within a given distance radially from the axle, paddles carried by the wind-wheel and extending radially therefrom a fixed distance beyond said given distance, means rotatably supporting the wind-wheel with its axle spaced above the level of a body of water a distance substantially equal to the given distance, means shielding from the wind the wind-wheel blades at one side of the axle and arcuate troughs providing channels along spaced portions of the path of travel of the panels and including opposite ends one below and the other above the level of said body of water.

ULYSSES G. ROGERS.